(12) United States Patent
Liu et al.

(10) Patent No.: US 11,086,180 B1
(45) Date of Patent: Aug. 10, 2021

(54) DISPLAY PANEL COMPRISING A PLURALITY OF SUBPIXELS, COUNTER SUBSTRATE COMPRISING A PLURALITY OF SUBPIXELS, ARRAY SUBSTRATE COMPRISING A PLURALITY OF SUB PIXELS, METHOD OF OPERATING DISPLAY PANEL, AND METHOD OF FABRICATING DISPLAY PANEL

(71) Applicants: BEIJING BOE DISPLAY TECHNOLOGY CO., LTD., Beijing (CN); BOE Technology Group Co., Ltd., Beijing (CN)

(72) Inventors: Bingyang Liu, Beijing (CN); Dongchuan Chen, Beijing (CN); Xueqiang Qian, Beijing (CN); Dan Wang, Beijing (CN); Xinli Ma, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 67 days.

(21) Appl. No.: 16/631,444

(22) PCT Filed: Nov. 15, 2018

(86) PCT No.: PCT/CN2018/115656
§ 371 (c)(1),
(2) Date: Jan. 15, 2020

(87) PCT Pub. No.: WO2020/097854
PCT Pub. Date: May 22, 2020

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136209* (2013.01); *G02F 1/136222* (2021.01)

(58) Field of Classification Search
None
See application file for complete search history.

(56) References Cited

U.S. PATENT DOCUMENTS

2019/0162997 A1\* 5/2019 Asakura ................ G02F 1/1681

\* cited by examiner

*Primary Examiner* — James A Dudek
(74) *Attorney, Agent, or Firm* — Intellectual Valley Law, P.C.

(57) ABSTRACT

A display panel having a plurality of subpixels. Each of the plurality of subpixels includes a first light emitting portion and a second light emitting portion. The display panel includes a black matrix on a base substrate. The black matrix defines a plurality of subpixel apertures. The first light emitting portion is outside the plurality of subpixel apertures. The second light emitting portion is in a respective one of the plurality of subpixel apertures. An orthographic projection of the black matrix on the base substrate covers an orthographic projection of the first light emitting portion of each of the plurality of subpixels on the base substrate, and is substantially non-overlapping with an orthographic projection of the second light emitting portion of each of the plurality of subpixels on the base substrate. The first light emitting portion includes a plurality of electronic ink microcapsules.

20 Claims, 9 Drawing Sheets

DISPLAY PANEL COMPRISING A PLURALITY OF SUBPIXELS, COUNTER SUBSTRATE COMPRISING A PLURALITY OF SUBPIXELS, ARRAY SUBSTRATE COMPRISING A PLURALITY OF SUB PIXELS, METHOD OF OPERATING DISPLAY PANEL, AND METHOD OF FABRICATING DISPLAY PANEL

CROSS-REFERENCE TO RELATED APPLICATION

This application is a national stage application under 35 U.S.C. § 371 of International Application No. PCT/CN2018/115656, filed Nov. 15, 2018, the contents of which are incorporated by reference in the entirety.

TECHNICAL FIELD

The present invention relates to display technology, more particularly, to a display panel comprising a plurality of subpixels, a counter substrate comprising a plurality of subpixel areas, an array substrate comprising a plurality of subpixel areas, a method of operating a display panel, and a method of fabricating a display panel.

BACKGROUND

Display devices such as liquid crystal display (LCD) and organic light-emitting diode (OLED) have been widely used. In recent years, electronic papers have been developed as thin and flexible display devices. In an electronic paper display, microcapsules of charged particles suspended in solution undergo movement upon application of an electric field, to display an image. Microcapsules may include a color generating agent for color image display.

SUMMARY

In one aspect, the present invention provides a display panel comprising a plurality of subpixels, wherein each of the plurality of subpixels comprises a first light emitting portion and a second light emitting portion; the display panel comprises a black matrix on a base substrate, the black matrix defining a plurality of subpixel apertures, the first light emitting portion being outside the plurality of subpixel apertures, the second light emitting portion being in a respective one of the plurality of subpixel apertures; an orthographic projection of the black matrix on the base substrate covers an orthographic projection of the first light emitting portion of each of the plurality of subpixels on the base substrate, and is substantially non-overlapping with an orthographic projection of the second light emitting portion of each of the plurality of subpixels on the base substrate; and the first light emitting portion comprises a plurality of electronic ink microcapsules.

Optionally, the display panel comprises a first driving circuit comprising a plurality of first gate lines, a plurality of first data lines, and a plurality of first thin film transistors configured to respectively drive light emission of first light emitting portions of the plurality of subpixels; a second driving circuit comprising a plurality of second gate lines, a plurality of second data lines, and a plurality of second thin film transistors configured to respectively drive light emission of second light emitting portions of the plurality of subpixels.

Optionally, the display panel is configured to operate in a first display mode or a second display mode; wherein, in the first display mode, the first driving circuit is configured to drive light emission of the first light emitting portions of the plurality of subpixels whereas light emission of the second light emitting portions of the plurality of subpixels is turned off; and in the second display mode, the second driving circuit is configured to drive light emission of the second light emitting portions of the plurality of subpixels whereas light emission of the first light emitting portions of the plurality of subpixels is turned off.

Optionally, the orthographic projection of the black matrix on the base substrate covers orthographic projections of the first driving circuit and the second driving circuit on the base substrate.

Optionally, the display panel comprises an array substrate and a counter substrate facing the array substrate; wherein the first driving circuit and the plurality of electronic ink microcapsules are in the counter substrate; and the second driving circuit is in the array substrate.

Optionally, the display panel further comprises a color filter comprising a plurality of color filter blocks.

Optionally, an orthographic projection of the color filter on the base substrate is substantially non-overlapping with the orthographic projection of the first light emitting portion of each of the plurality of subpixels on the base substrate; and an orthographic projection of each individual one of the plurality of color filter blocks on the base substrate covers an orthographic projection of the second light emitting portion in a respective one of the plurality of subpixels on the base substrate.

Optionally, the display panel comprises an array substrate and a counter substrate facing the array substrate; wherein the color filter is in the counter substrate.

Optionally, the display panel comprises an array substrate and a counter substrate facing the array substrate; wherein the black matrix is in the array substrate.

Optionally, the display panel comprises an array substrate and a counter substrate facing the array substrate; a liquid crystal layer between the array substrate and the counter substrate; and a back light module configured to provide back light to the second light emitting portion of each of the plurality of subpixels.

In another aspect, the present invention provides a display apparatus, comprising the display panel described herein or fabricated by a method described herein, and one or more integrated circuits connected to the display panel.

Optionally, the one or more integrated circuits comprises a control circuit configured to control the display panel to operate in a first display mode or a second display mode; wherein, in the first display mode, the control circuit is configured to drive light emission of the first light emitting portions of the plurality of subpixels whereas light emission of the second light emitting portions of the plurality of subpixels is turned off; and in the second display mode, the control circuit is configured to drive light emission of the second light emitting portions of the plurality of subpixels whereas light emission of the first light emitting portions of the plurality of subpixels is turned off.

In another aspect, the present invention provides a counter substrate comprising a plurality of subpixel areas, wherein each of the plurality of subpixel areas comprises a first light emitting portion and a second light emitting portion, the first light emitting portion comprising a plurality of electronic ink microcapsules; the counter substrate further comprises a first driving circuit comprising a plurality of first gate lines, a plurality of first data lines, and a plurality of first thin film transistors configured to respectively drive light emission of first light emitting portions of the plurality of subpixel areas, the plurality of first gate lines and the plurality of first data lines intersect each other to define the plurality of subpixel areas; and a color filter comprising a plurality of color filter blocks on a base substrate; wherein an orthographic projection of the color filter on the base substrate is substantially non-overlapping with an orthographic projection of the first light emitting portion of each of the plurality of subpixel areas on the base substrate; and an orthographic projection of each individual one of the plurality of color filter blocks on the base substrate covers an orthographic projection of the second light emitting portion in a respective one of the plurality of subpixel areas on the base substrate.

Optionally, the counter substrate further comprises a black matrix on the base substrate, the black matrix defining a plurality of subpixel apertures, the first light emitting portion being outside the plurality of subpixel apertures, the second light emitting portion being in a respective one of the plurality of subpixel apertures; wherein an orthographic projection of the black matrix on the base substrate covers an orthographic projection of the first light emitting portion of each of the plurality of subpixel areas on the base substrate.

In another aspect, the present invention provides an array substrate comprising a plurality of subpixel areas, wherein each of the plurality of subpixel areas comprises a first light emitting portion and a second light emitting portion, the first light emitting portion comprising a plurality of electronic ink microcapsules; the array substrate further comprises a black matrix on a base substrate, the black matrix defining a plurality of subpixel apertures, the first light emitting portion being outside the plurality of subpixel apertures, the second light emitting portion being in a respective one of the plurality of subpixel apertures; a first driving circuit comprising a plurality of first gate lines, a plurality of first data lines, and a plurality of first thin film transistors configured to respectively drive light emission of first light emitting portions of the plurality of subpixel areas; and a second driving circuit comprising a plurality of second gale lines, a plurality of second data lines, and a plurality of second thin film transistors configured to respectively drive light emission of second light emitting portions of the plurality of subpixel areas; wherein an orthographic projection of the black matrix on the base substrate covers an orthographic projection of the first light emitting portion of each of the plurality of subpixel areas on the base substrate, and is substantially non-overlapping with an orthographic projection of the second light emitting portion of each of the plurality of subpixel areas on the base substrate.

Optionally, the orthographic projection of the black matrix on the base substrate covers orthographic projections of the first driving circuit and the second driving circuit on the base substrate; and the plurality of first gate lines and the plurality of first data lines intersect each other, and the plurality of second gate lines and the plurality of second data lines intersect each other, thereby defining the plurality of subpixel areas.

Optionally, the array substrate further comprises a color filter comprising a plurality of color filter blocks.

Optionally, an orthographic projection of the color filter on the base substrate is substantially non-overlapping with the orthographic projection of the first light emitting portion of each of the plurality of subpixel areas on the base substrate; and an orthographic projection of each individual one of the plurality of color filter blocks on the base substrate covers an orthographic projection of the second light emitting portion in a respective one of the plurality of subpixel areas on the base substrate.

In another aspect, the present invention provides a method of operating a display panel described herein or fabricated by a method described herein to display image in a first display mode or a second display mode, the display panel comprising a plurality of subpixels; wherein each of the plurality of subpixels comprises a first light emitting portion and a second light emitting portion; the display panel comprises a black matrix on a base substrate, the black matrix defining a plurality of subpixel apertures, the first light emitting portion being outside the plurality of subpixel apertures, the second light emitting portion being in a respective one of the plurality of subpixel apertures; an orthographic projection of the black matrix on the base substrate covers an orthographic projection of the first light emitting portion of each of the plurality of subpixels on the base substrate; and the first light emitting portion comprises a plurality of electronic ink microcapsules; the method comprises, in the first display mode, driving light emission of the first light emitting portions of the plurality of subpixels while turning off light emission of the second light emitting portions of the plurality of subpixels; and, in the second display mode, driving light emission of the second light emitting portions of the plurality of subpixels while turning off light emission of the first light emitting portions of the plurality of subpixels.

In another aspect, the present invention provides a method of fabricating a display panel described herein, comprising forming a plurality of subpixels; and forming a black matrix on a base substrate to define a plurality of subpixel apertures; wherein forming the plurality of subpixels comprises forming a first light emitting portion and forming a second light emitting portion in each of the plurality of subpixels; the first light emitting portion is formed outside the plurality of subpixel apertures; the second light emitting portion is formed in a respective one of the plurality of subpixel apertures; the black matrix is formed so that an orthographic projection of the black matrix on the base substrate covers an orthographic projection of the first light emitting portion of each of the plurality of subpixels on the base substrate; and forming the first light emitting portion comprises forming a plurality of electronic ink microcapsules.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display panel including a plurality of subpixels, a counter substrate including a plurality of subpixel areas, an array substrate including a plurality of subpixel areas, a method of operating a display panel, and a method of fabricating a display panel that substantially obviate one or more of the problems due to limitations and disadvantages of the related art. In one aspect, the present disclosure provides a novel display panel having a plurality of subpixels. In some embodiments, each of the plurality of subpixels includes a first light emitting portion and a second light emitting portion. The display panel includes a black matrix on a base substrate. The black matrix defines a plurality of subpixel apertures. Optionally, the first light emitting portion is outside the plurality of subpixel apertures, and the second light emitting portion is in a respective one of the plurality of subpixel apertures. Optionally, an orthographic projection of the black matrix on the base substrate covers an orthographic projection of the first light emitting portion of each of the plurality of subpixels on the base substrate, and is substantially non-overlapping with an orthographic projection of the second light emitting portion of each of the plurality of subpixels on the base substrate. Optionally, the first light emitting portion comprises a plurality of electronic ink microcapsules.

Figure 1:
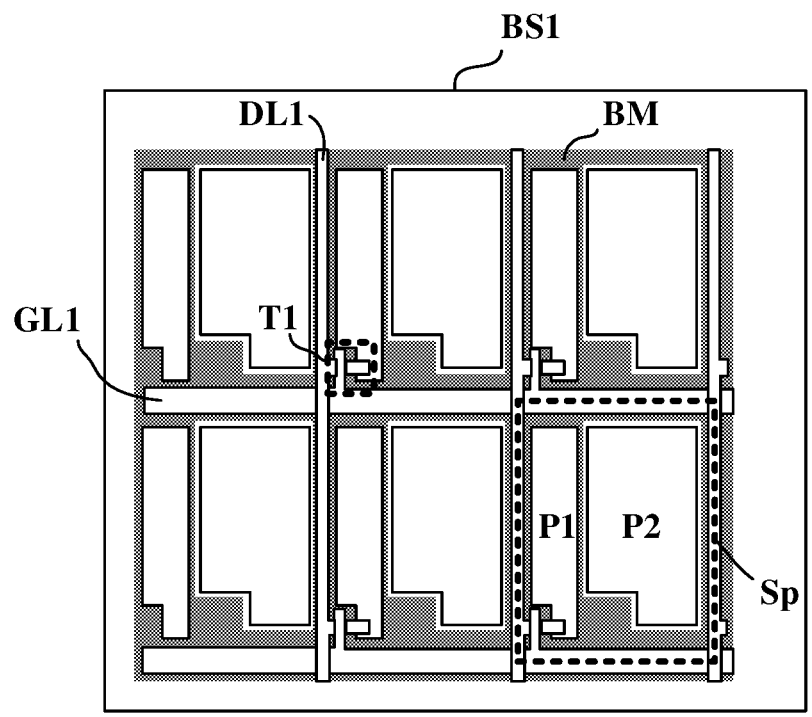
FIG. 1 is a schematic diagram illustrating the structure of a display panel in some embodiments according to the present disclosure.

FIG. 1 is a schematic diagram illustrating the structure of a display panel in some embodiments according to the present disclosure. Referring to FIG. 1, the display panel in some embodiments has a plurality of subpixels Sp. Each of the plurality of subpixels Sp includes a first light emitting portion P1 and a second light emitting portion P2 adjacent to each other. The first light emitting portion P1 and the second light emitting portion P2 are non-overlapping with respect to each other, and are independently controlled to emit light. Optionally, the first light emitting portion P1 is an electrophoretic display portion, e.g., an electronic ink display portion. For example, the first light emitting portion P1 in some embodiments includes a plurality of electronic ink microcapsules. The second light emitting portion P2 may be any appropriate display portion. Optionally, the second light emitting portion P2 is a liquid crystal display portion. Optionally, the second light emitting portion P2 is an organic light emitting diode display portion. Optionally, the second light emitting portion P2 is a micro light emitting diode display portion.

Figure 2:
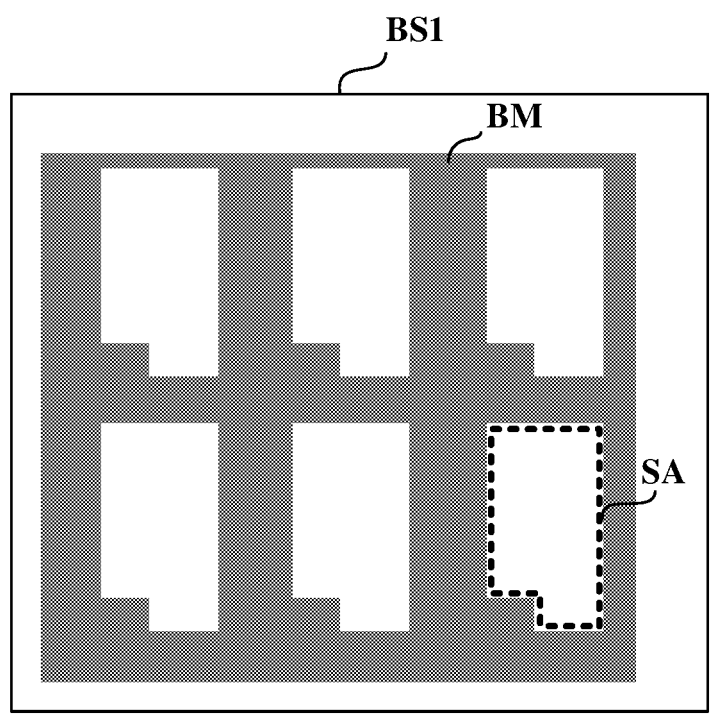
FIG. 2 is a schematic diagram illustrating the structure of a black matrix in some embodiments according to the present disclosure.

In some embodiments, the display panel includes a black matrix on a base substrate. FIG. 2 is a schematic diagram illustrating the structure of a black matrix in some embodiments according to the present disclosure. Referring to FIG. 1 and FIG. 2, the black matrix BM in some embodiments defines a plurality of subpixel apertures SA. The first light emitting portion P1 is outside the plurality of subpixel apertures SA. The second light emitting portion P2 is in a respective one of the plurality of subpixel apertures SA. An orthographic projection of the black matrix BM on the first base substrate BS1 covers an orthographic projection of the first light emitting portion P1 of each of the plurality of subpixels Sp on the first base substrate BS1, and is substantially non-overlapping with an orthographic projection of the second light emitting portion P2 of each of the plurality of subpixels Sp on the first base substrate BS1.

Figure 3:
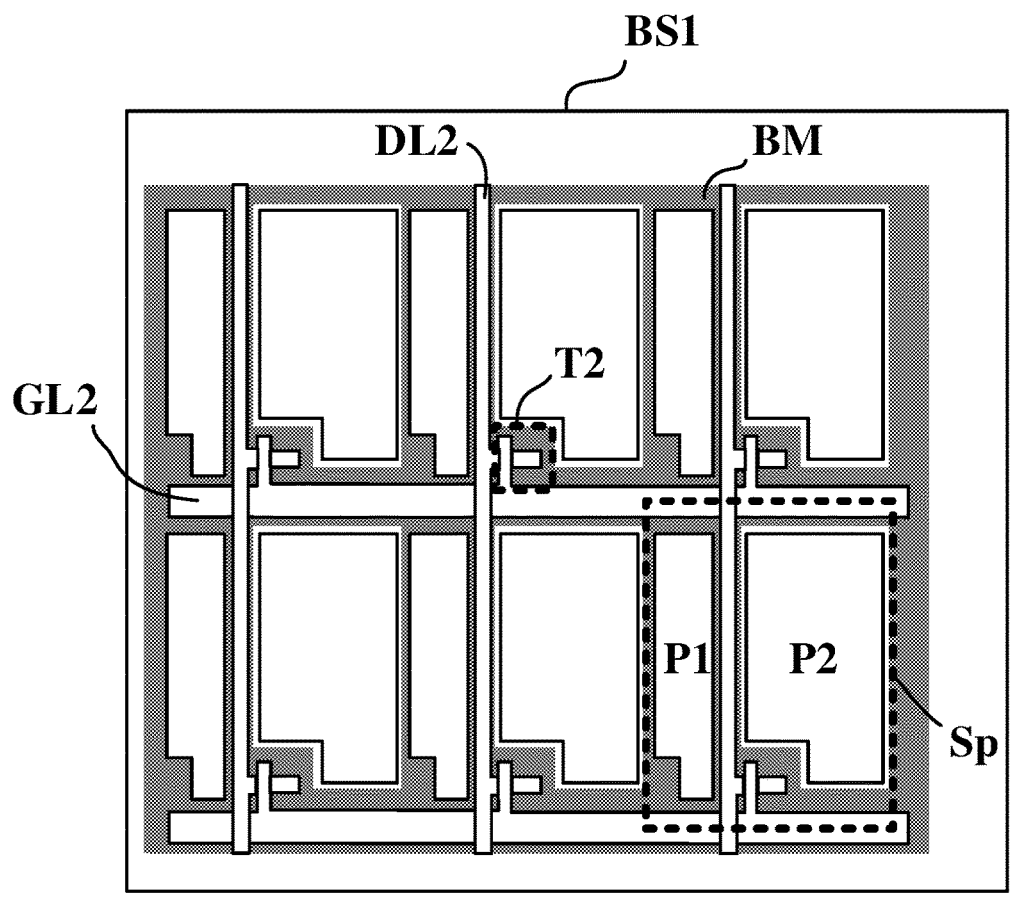
FIG. 3 is a schematic diagram illustrating the structure of a display panel in some embodiments according to the present disclosure.

FIG. 3 is a schematic diagram illustrating the structure of a display panel in some embodiments according to the present disclosure. FIG. 1 and FIG. 3 may be plan views of different planes of the display panel, or may be plan views of different substrates (e.g., an array substrate and a counter substrate) of the display panel. Referring to FIG. 1, in some embodiments, the display panel further includes a first driving circuit. The first driving circuit is configured to respectively drive light emission of first light emitting portions of the plurality of subpixels Sp. The first driving circuit in some embodiments includes a plurality of first gate lines GL1, a plurality of first data lines DL1, and a plurality of first thin film transistors T1. Referring to FIG. 3, in some embodiments, the display panel further includes a second driving circuit. The second driving circuit is configured to respectively drive light emission of second light emitting portions of the plurality of subpixels Sp. The second driving circuit in some embodiments includes a plurality of second gate lines GL2, a plurality of second data lines DL2, and a plurality of second thin film transistors T2. Optionally, the first light emitting portion P1 in a first subpixel is spaced apart from the second light emitting portion P2 from an adjacent subpixel of the plurality of subpixels Sp by one of the plurality of first data lines DL1, as shown in FIG. 1. Optionally, the first light emitting portion P1 and the second light emitting portion P2 in a same subpixel are spaced apart from each other by one of the plurality of second data lines DL2, as shown in FIG. 3. The plurality of first gate lines GL1 and the plurality of first data lines DL1 intersect each other. The plurality of second gate lines GL2 and the plurality of second data lines DL2 intersect each other. The plurality of subpixels Sp optionally are defined by the plurality of first gate lines GL1 and the plurality of first data lines DL1, as shown in FIG. 1. Alternatively, the plurality of subpixels Sp may be defined by the plurality of second gate lines GL2 and the plurality of second data lines DL2.

Referring to FIG. 1 and FIG. 3, the black matrix BM functions to shield light. In some embodiments, the orthographic projection of the black matrix BM on the first base substrate BS1 covers orthographic projections of the first driving circuit and the second driving circuit on the first base substrate BS1, so that light reflected by the first driving circuit and the second driving circuit would not be seen by a viewer.

Figure 4A:
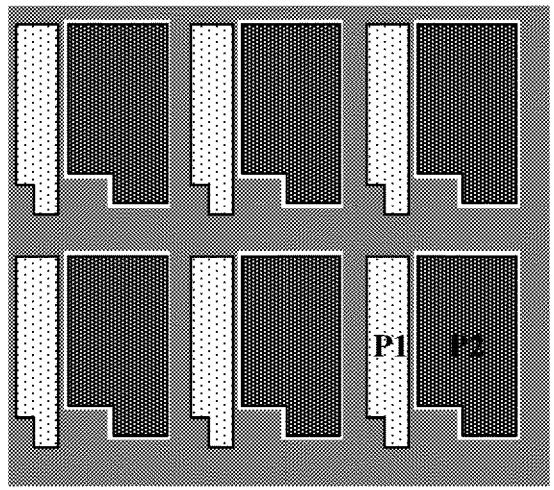
FIGS. 4A and 4B illustrate different display modes of a display panel in some embodiments according to the present disclosure.
Figure 4B:
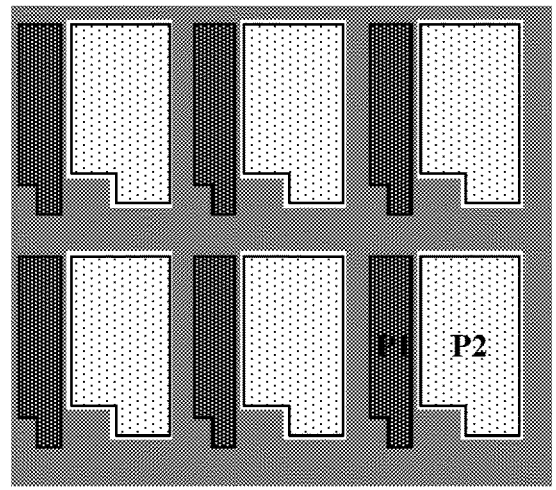

In some embodiments, the display panel is configured to operate in a first display mode or a second display mode. FIGS. 4A and 4B illustrate different display modes of a display panel in some embodiments according to the present disclosure. FIG. 4A illustrates a first display mode of the display panel, and FIG. 4B illustrates a second display mode of the display panel. Referring to FIG. 4A, in the first display mode, the first driving circuit is configured to drive light emission of the first light emitting portions of the plurality of subpixels Sp whereas light emission of the second light emitting portions of the plurality of subpixels Sp is turned off. In each of the plurality of subpixels Sp, the first light emitting portion P1 (bright) is configured to display an image, and the second light emitting portion P2 (dark) is turned off. Referring to FIG. 4B, in the second display mode, the second driving circuit is configured to drive light emission of the second light emitting portions of the plurality of subpixels Sp whereas light emission of the first light emitting portions of the plurality of subpixels Sp is turned off, in each of the plurality of subpixels Sp, the second light emitting portion P2 (bright) is configured to display an image, and the first light emitting portion P1 (dark) is turned off.

Figure 5:
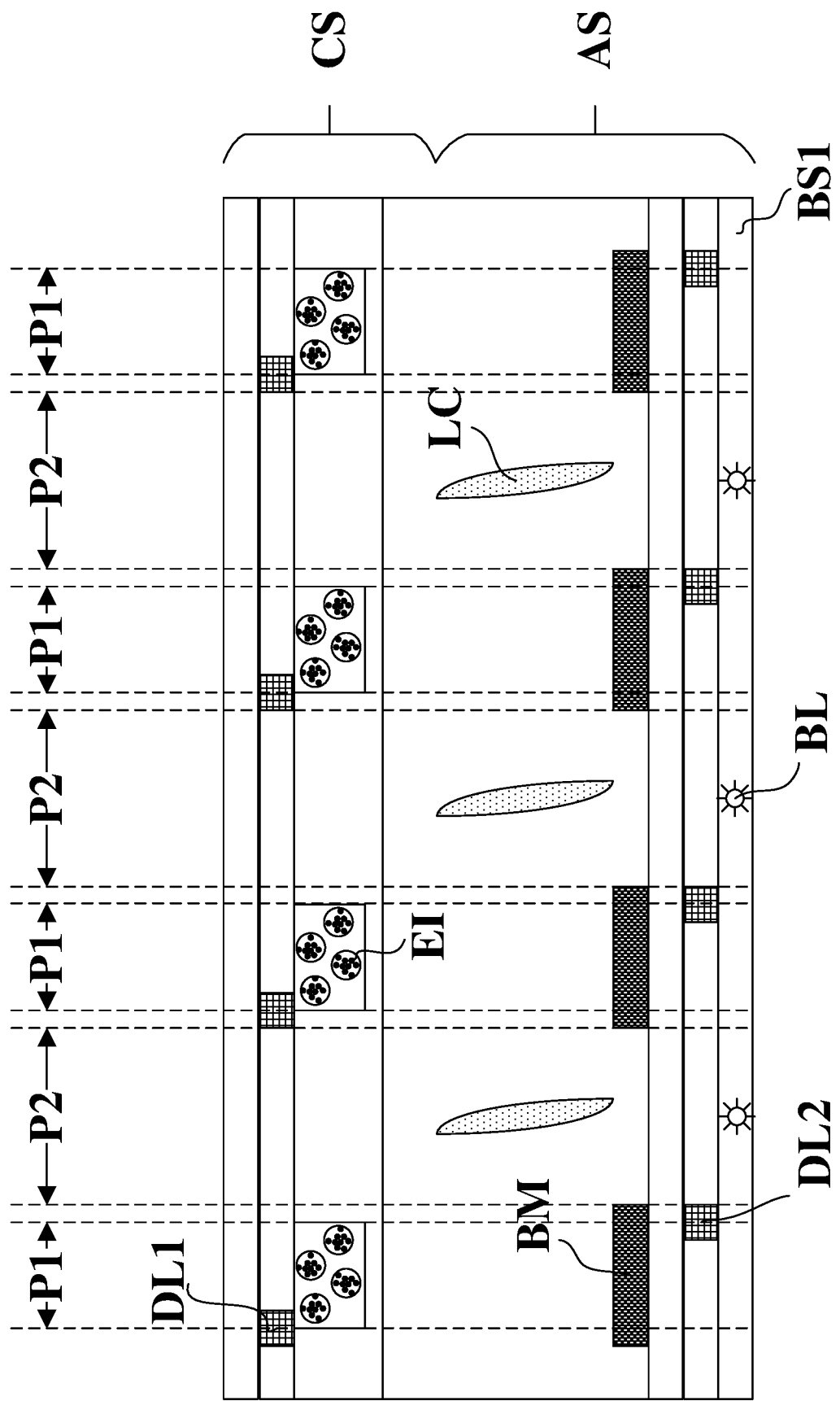
FIG. 5 is a cross-sectional view of a display panel in some embodiments according to the present disclosure.

In some embodiments, the display panel includes an array substrate and a counter substrate. FIG. 5 is a cross-sectional view of a display panel in some embodiments according to the present disclosure. Referring to FIG. 5, the display panel includes an array substrate AS and a counter substrate CS, and a liquid crystal layer LC between the array substrate AS and the counter substrate CS. In FIG. 5, the second light emitting portion P2 is a liquid crystal display portion, and the display panel further includes a back light module BL for providing light for the second light emitting portion P2. Alternatively, the second light emitting portion P2 may be other appropriate light emitting portions such as an organic light emitting portion.

Referring to FIG. 5, in some embodiments, the first light emitting portion P1 includes a plurality of electronic ink microcapsules EI, which are disposed in the counter substrate CS. Accordingly, in some embodiments, the first driving circuit (including the plurality of first data lines DL1 as shown in FIG. 5) and the plurality of electronic ink microcapsules EI are disposed in the counter substrate CS. Optionally, the second driving circuit (including the plurality of second data lines DL2 as shown in FIG. 5) and the black matrix BM are disposed in the array substrate AS. An orthographic projection of the first light emitting portion P1 on the first base substrate BS1 is non-overlapping with an orthographic projection of the second light emitting portion P2 on the first base substrate BS1. An orthographic projection of the black matrix BM on the first base substrate BS1 covers the orthographic projection of the first light emitting portion P1 on the first base substrate BS1 The orthographic projection of the black matrix BM on the first base substrate BS1 is non-overlapping with the orthographic projection of the second light emitting portion P2 on the first base substrate BS1.

Figure 6:
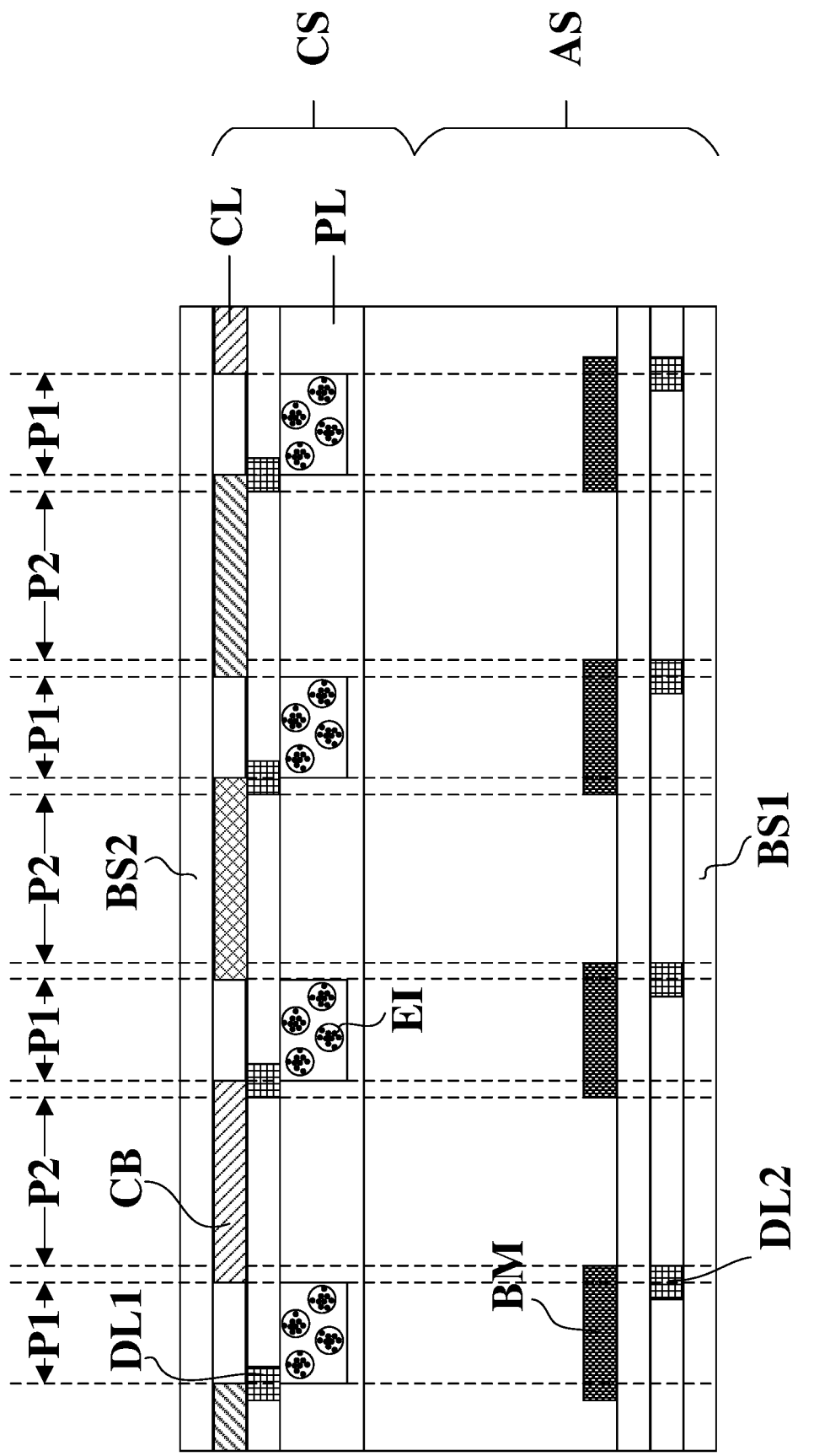
FIG. 6 is a cross-sectional view of a display panel in some embodiments according to the present disclosure.

In some embodiments, the display panel further includes a color filter. FIG. 6 is a cross-sectional view of a display panel in some embodiments according to the present disclosure. Referring to FIG. 6, in some embodiments, the color filter CL is in the counter substrate CS, and includes a plurality of color filter blocks CB. Optionally, an orthographic projection of the color filter CL on the first base substrate BS1 is substantially non-overlapping with the orthographic projection of the first light emitting portion P1 of each of the plurality of subpixels Sp on the first base substrate BS1. Optionally, an orthographic projection of each individual one of the plurality of color filter blocks on the first base substrate BS1 covers an orthographic projection of the second light emitting portion in a respective one of the plurality of subpixels on the first base substrate BS1. In one example, the second light emitting portion P2 displays color image, and the first light emitting portion P1 displays a black-and-white image. In another example, the plurality of electronic ink microcapsules are color ink microcapsules, and the first light emitting portion P1 displays a color image even though the color filter CL does not cover the first light emitting portion P1.

Figure 7:
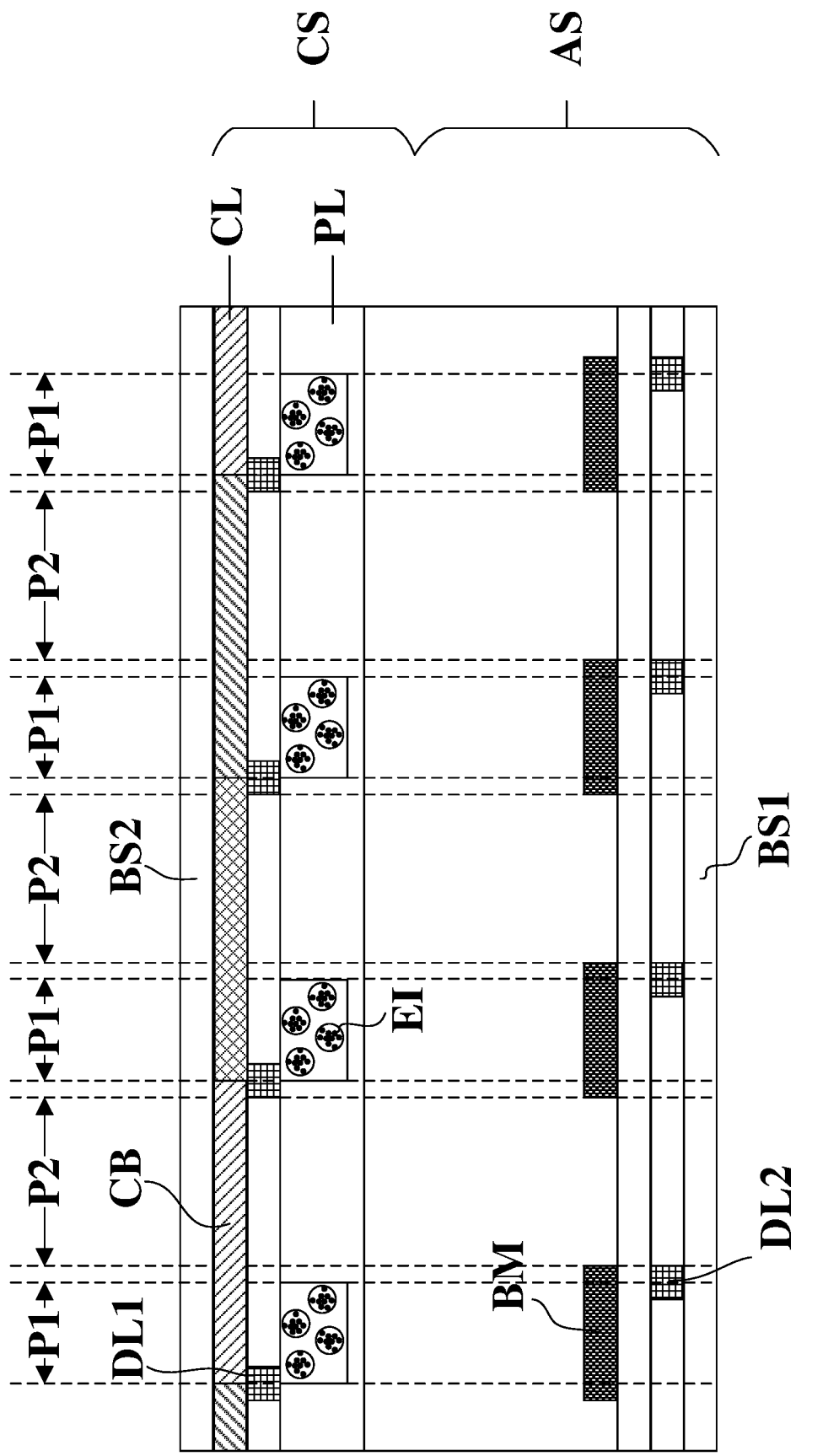
FIG. 7 is a cross-sectional view of a display p some embodiments according to the present disclosure.

FIG. 7 is a cross-sectional view of a display panel in some embodiments according to the present disclosure. Referring to FIG. 7, the color filter CL is in the counter substrate CS. Optionally, the orthographic projection of each individual one of the plurality of color filter blocks CB on the first base substrate BS1 covers not only the orthographic projection of the second light emitting portion P2 in a respective one of the plurality of subpixels Sp on the first base substrate BS1, but also covers the orthographic projection of the first light emitting portion P1 in a respective one of the plurality of subpixels Sp on the first base substrate BS1. Accordingly, both the first light emitting portion P1 and the second light emitting portion P2 are configured to display color images.

In FIG. 6 and FIG. 7, the plurality of electronic ink microcapsules EI are disposed on a side of the counter substrate CS facing the array substrate AS. The counter substrate CS further includes a protective coating layer PL on a side of the plurality of electronic ink microcapsules EI proximal to the array substrate AS to cover the plurality of electronic ink microcapsules EI.

Figure 8:
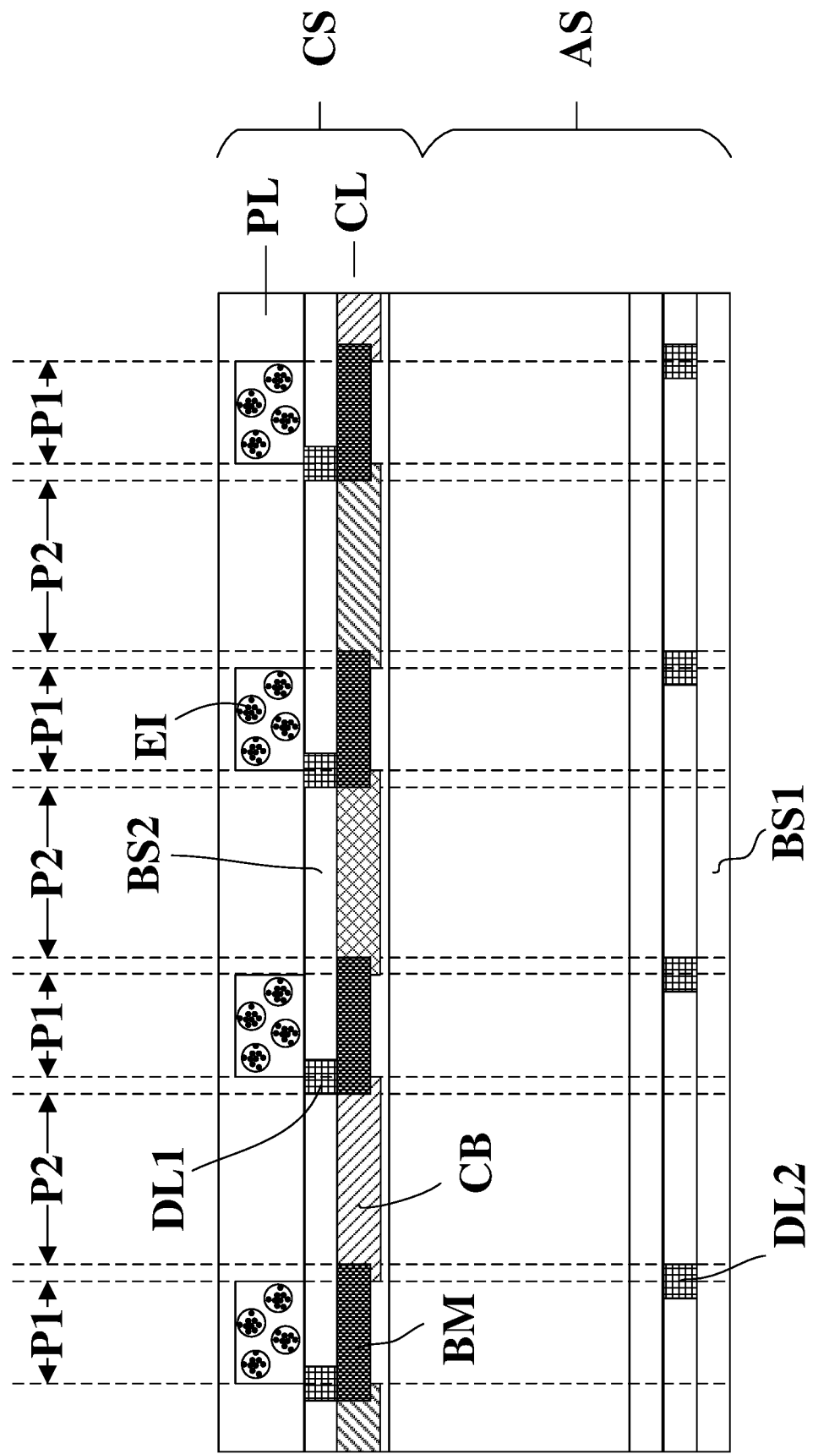
FIG. 8 is a cross-sectional view of a display panel in some embodiments according to the present disclosure.

FIG. 8 is a cross-sectional view of a display panel in some embodiments according to the present disclosure. Referring to FIG. 8, the plurality of electronic ink microcapsules EI are disposed on a side of the counter substrate CS distal to the array substrate AS. The counter substrate CS further includes a protective coating layer PL on a side of the plurality of electronic ink microcapsules EI distal to the array substrate AS to cover the plurality of electronic ink microcapsules EI.

Referring to FIG. 8, in some embodiments, both the black matrix BM and the color filter CL are in the counter substrate CS. The plurality of electronic ink microcapsules EI are disposed on a side of the black matrix BM distal to the array substrate AS, and the plurality of color filter blocks CB are respectively disposed in a plurality of subpixel apertures defined by the black matrix BM.

Figure 9:
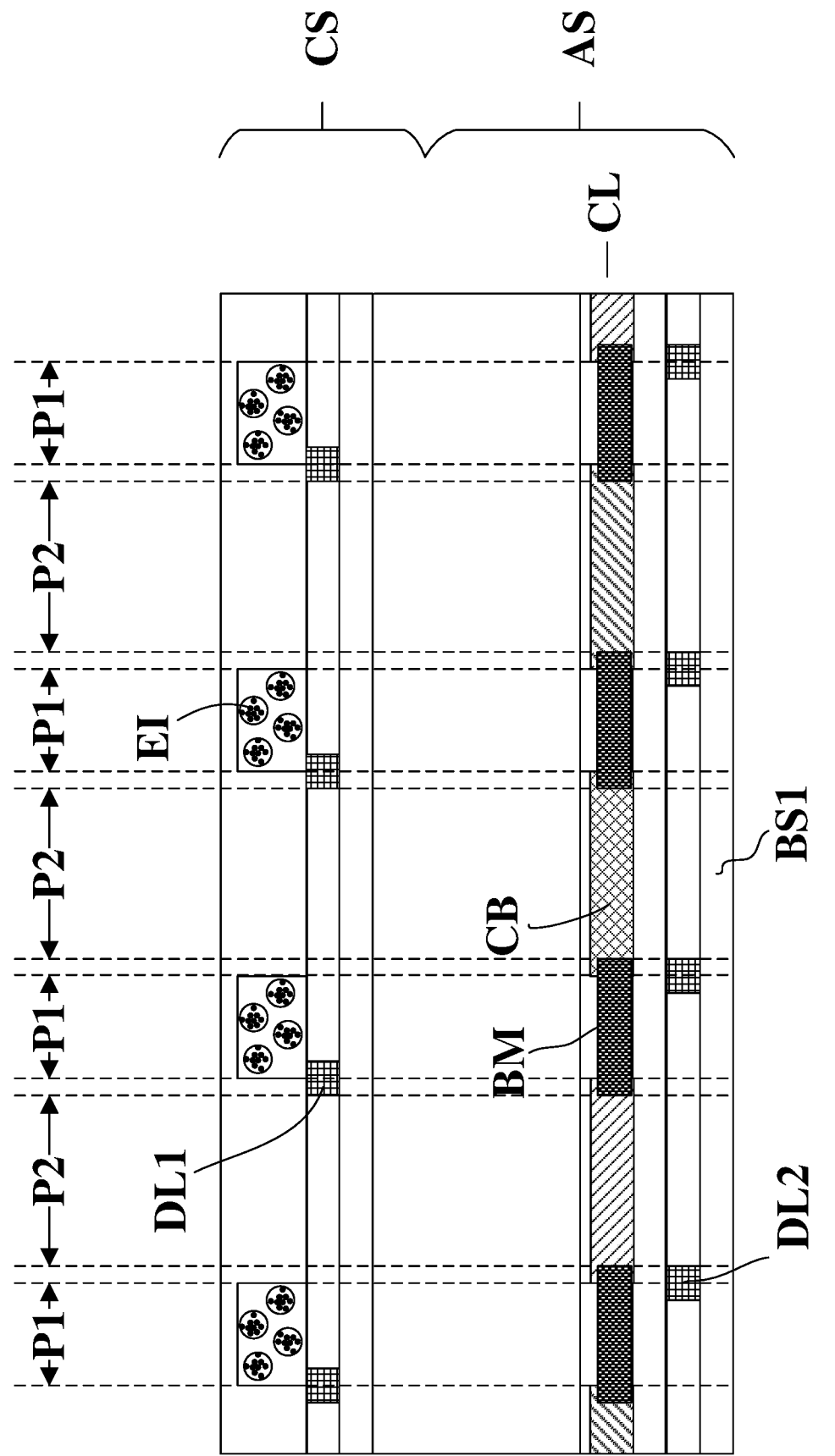
FIG. 9 is a cross-sectional view of a display panel in some embodiments according to the present disclosure.

FIG. 9 is a cross-sectional view of a display panel in some embodiments according to the present disclosure. Referring to FIG. 9, in some embodiments, both the black matrix BM and the color filter CL are in the array substrate AS, while the plurality of electronic ink microcapsules EI are disposed in the counter substrate CS. The plurality of electronic ink microcapsules EI are disposed on a side of the black matrix BM distal to the array substrate AS. The plurality of color filter blocks CB are respectively disposed in a plurality of subpixel apertures defined by the black matrix BM.

Figure 10:
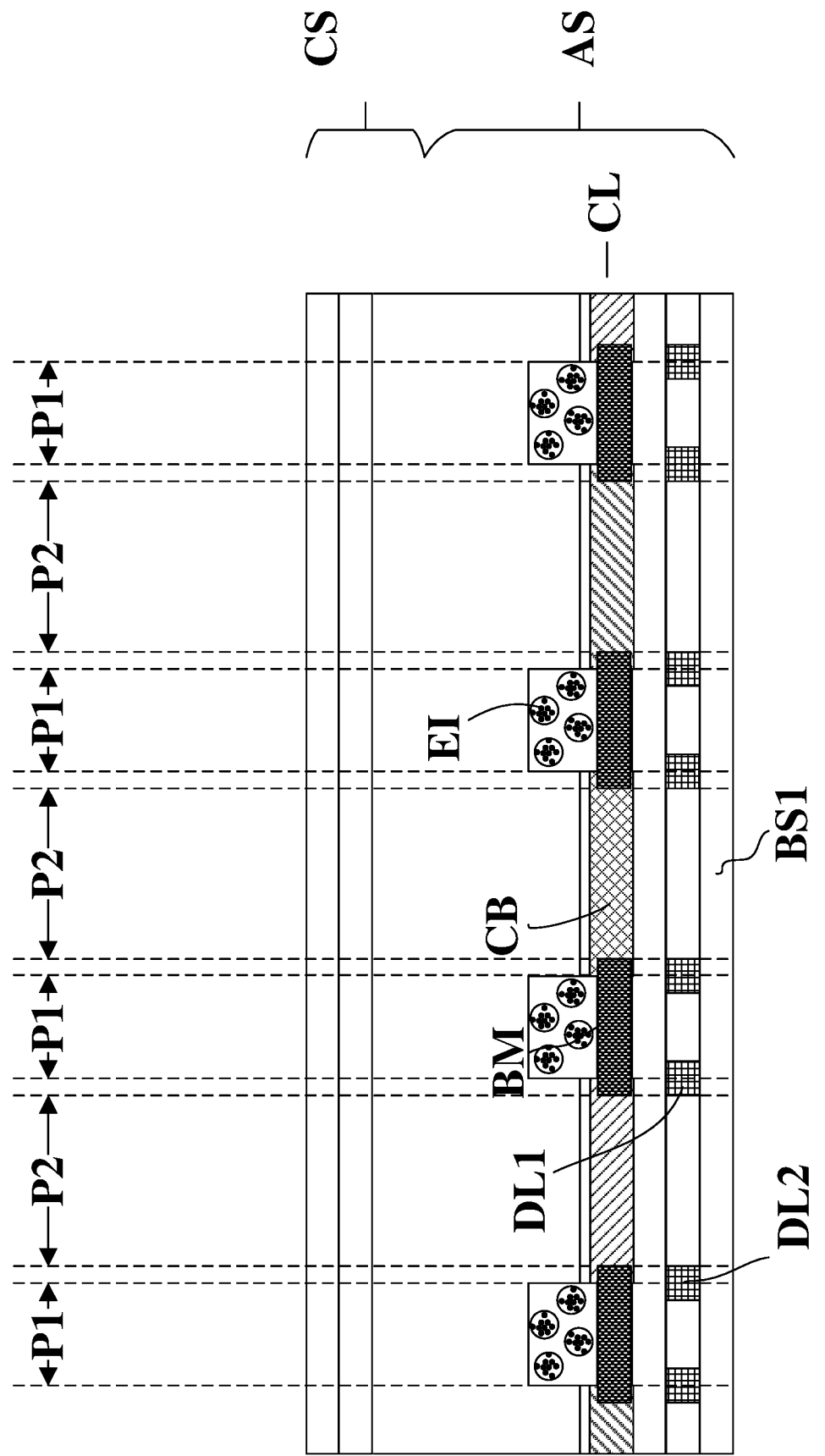
FIG. 10 is a cross-sectional view of a display panel in some embodiments according to the present disclosure.

FIG. 10 is a cross-sectional view of a display panel in some embodiments according to the present disclosure. Referring to FIG. 10, in some embodiments, the black matrix BM, the color filter CL, and the plurality of electronic ink microcapsules EI are all disposed in the array substrate AS. The plurality of electronic ink microcapsules EI are disposed on a side of the black matrix BM distal to the first base substrate BS1. The plurality of color filter blocks CB are respectively disposed in a plurality of subpixel apertures defined by the black matrix BM.

Figure 11:
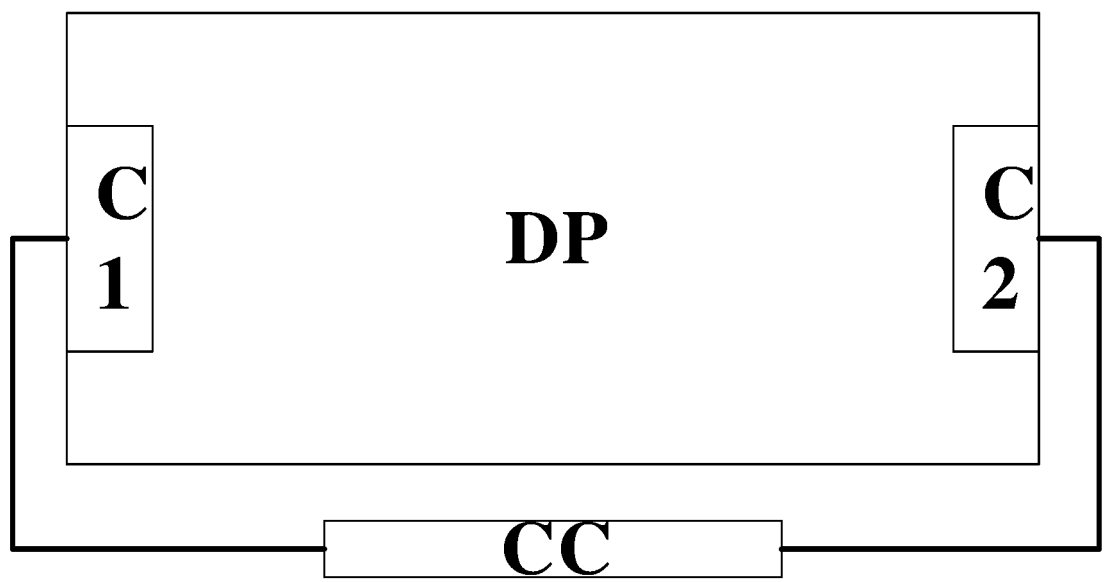
FIG. 11 is a schematic diagram illustrating the structure of a display apparatus in some embodiments according to the present disclosure.

In another aspect, the present disclosure further provides a display apparatus having the display panel described herein or fabricated by a method described herein. In some embodiments, the display apparatus further includes one or more integrated circuits connected to the display panel. FIG. 11 is a schematic diagram illustrating the structure of a display apparatus in some embodiments according to the present disclosure. Referring to FIG. 11, the display apparatus in some embodiments includes a display panel DP and a control circuit CC connected to the display panel DP. The display panel DP in some embodiments includes a first driving circuit C1 configured to drive light emission of the first light emitting portions of the plurality of subpixels, and a second driving circuit C2 configured to drive light emission of the second light emitting portions of the plurality of subpixels. The control circuit CC is connected to the first driving circuit C1 and the second driving circuit C2. The control circuit CC is configured to control the display panel to operate in a first display mode or a second display mode. Optionally, in the first display mode, the control circuit CC is configured to drive light emission of the first light emitting portions of the plurality of subpixels whereas light emission of the second light emitting portions of the plurality of subpixels is turned off. Optionally, in the second display mode, the control circuit CC is configured to drive light emission of the second light emitting portions of the plurality of subpixels whereas light emission of the first light emitting portions of the plurality of subpixels is turned off.

Examples of appropriate display apparatuses include, but are not limited to, an electronic paper, a mobile phone, a tablet computer, a television, a monitor, a notebook computer, a digital album, a GPS, etc.

In another aspect, the present disclosure further provides a method of operating a display panel. In some embodiments, the method includes displaying image in a first display mode or a second display mode. Optionally, in the first display mode, the method includes driving light emission of the first light emitting portions of the plurality of subpixels while turning off light emission of the second light emitting portions of the plurality of subpixels. Optionally, in the second display mode, the method includes driving light emission of the second light emitting portions of the plurality of subpixels while turning off light emission of the first light emitting portions of the plurality of subpixels.

In another aspect, the present disclosure further provides a display substrate having a plurality of subpixel areas. The display substrate can be an array substrate or a counter substrate. In some embodiments, the present disclosure provides a counter substrate having a plurality of subpixel areas. Each of the plurality of subpixel areas includes a first light emitting portion and a second light emitting portion. The first light emitting portion includes a plurality of electronic ink microcapsules.

In some embodiments, and referring to FIG. 1, the counter substrate further includes a first driving circuit having a plurality of first gate lines GL1, a plurality of first data lines DL1, and a plurality of first thin film transistors T1 configured to respectively drive light emission of first light emitting portions of the plurality of subpixel areas. The plurality of first gate lines GL1 and the plurality of first data lines DL1 intersect each other to define the plurality of subpixel areas.

Referring to FIGS. 6 to 8, in some embodiments, the counter substrate CS further includes a color filter CL having a plurality of color filter blocks CB on a second base substrate BS2. An orthographic projection of the color filter CL on the second base substrate BS2 is substantially non-overlapping with an orthographic projection of the first light emitting portion P1 of each of the plurality of subpixel areas on the second base substrate BS2. Optionally, an orthographic projection of each individual one of the plurality of color filter blocks CB on the second base substrate BS2 covers an orthographic projection of the second light emitting portion P2 in a respective one of the plurality of subpixel areas on the second base substrate BS2. The plurality of subpixel areas of the counter substrate CS correspond to the plurality of subpixels shown in FIGS. 6 to 8.

Referring to FIG. 8, in some embodiments, the counter substrate CS further includes a black matrix BM. Referring to FIG. 2, the black matrix BM defines a plurality of subpixel apertures SA, the first light emitting portion P1 being outside the plurality of subpixel apertures SA, the second light emitting portion P2 being in a respective one of the plurality of subpixel apertures SA. An orthographic projection of the black matrix BM on the second base substrate BS2 covers an orthographic projection of the first light emitting portion P1 of each of the plurality of subpixel areas on the second base substrate BS2.

In some embodiments, the present disclosure provides an array substrate having a plurality of subpixel areas. Each of the plurality of subpixel areas includes a first light emitting portion and a second light emitting portion. The first light emitting portion includes a plurality of electronic ink microcapsules. Referring to FIG. 10, in some embodiments, the array substrate AS includes a plurality of electronic ink microcapsules EI in the first light emitting portion P1. The array substrate AS further includes a black matrix BM on a first base substrate BS1. Referring to FIG. 2, the black matrix BM defines a plurality of subpixel apertures SA, the first light emitting portion P1 being outside the plurality of subpixel apertures SA, the second light emitting portion P2 being in a respective one of the plurality of subpixel apertures SA.

In some embodiments, the array substrate AS further includes a first driving circuit including a plurality of first gate lines, a plurality of first data lines, and a plurality of first thin film transistors configured to respectively drive light emission of first light emitting portions of the plurality of subpixel areas; and a second driving circuit including a plurality of second gate lines, a plurality of second data lines, and a plurality of second thin film transistors configured to respectively drive light emission of second light emitting portions of the plurality of subpixel areas. FIG. 10 shows a plurality of first data lines DL1 and a plurality of second data lines DL2 in the array substrate AS. An orthographic projection of the black matrix BM on the first base substrate BS1 covers an orthographic projection of the first light emitting portion P1 of each of the plurality of subpixel areas on the first base substrate BS1, and is substantially non-overlapping with an orthographic projection of the second light emitting portion P2 of each of the plurality of subpixel areas on the first base substrate BS1. The plurality of subpixel areas of the array substrate correspond to the plurality of subpixels in FIG. 10. Optionally, the orthographic projection of the black matrix BM on the first base substrate BS1 covers orthographic projections of the first driving circuit and the second driving circuit on the first base substrate BS1. The plurality of first gate lines and the plurality of first data lines intersect each other. The plurality of second gate lines and the plurality of second data lines intersect each other. The plurality of subpixel areas may be defined by the plurality of first gate lines and the plurality of first data lines. Alternatively, the plurality of subpixel areas may be defined by the plurality of second gate lines and the plurality of second data lines.

Referring to FIG. 10, in some embodiments, the array substrate AS further includes a color filter CL including a plurality of color filter blocks CB. Optionally, an orthographic projection of the color filter CL on the first base substrate BS1 is substantially non-overlapping with the orthographic projection of the first light emitting portion P1 of each of the plurality of subpixel areas on the first base substrate BS1. Optionally, an orthographic projection of each individual one of the plurality of color filter blocks CB on the first base substrate BS1 covers an orthographic projection of the second light emitting portion P2 in a respective one of the plurality of subpixel areas on the first base substrate BS1.

In another aspect, the present disclosure further provides a method of fabricating a display panel. In some embodiments, the method includes forming a plurality of subpixels, and forming a black matrix on a base substrate to define a plurality of subpixel apertures. Optionally, forming the plurality of subpixels includes forming a first light emitting portion and forming a second light emitting portion in each of the plurality of subpixels. The first light emitting portion is formed outside the plurality of subpixel apertures. The second light emitting portion is formed in a respective one of the plurality of subpixel apertures. Optionally, the black matrix is formed so that an orthographic projection of the black matrix on the base substrate covers an orthographic projection of the first light emitting portion of each of the plurality of subpixels on the base substrate. Moreover, forming the first light emitting portion comprises forming a plurality of electronic ink microcapsules.

In some embodiments, forming the plurality of electronic ink microcapsules includes forming a suspension by dispersing electronic ink microcapsules in a solvent, coating the suspension on a base substrate, removing the solvent to dry the suspension, thereby forming an electronic ink microcapsules layer, and patterning the electronic ink microcapsules layer to form a pattern of first light emitting portion of the plurality of subpixels. The plurality of electronic ink microcapsules may include various appropriate pigments, e.g., inorganic pigments, organic pigments, or any combination thereof. Examples of appropriate pigments include titanium oxide ($TiO_2$), calcium carbonate ($CaCO_3$), talc, black iron oxide, cadmium red, cadmium yellow, molybdenum red, cobalt green, cobalt blue, cobalt violet, manganese violet, an azo type pigment, a cyanine type pigment including copper phthalocyanine pigment, and an anthraquinone type pigment.

Optionally, the plurality of electronic ink microcapsules are formed in a counter substrate of the display panel. Optionally, the plurality of electronic ink microcapsules are formed in an array substrate of the display panel.

In some embodiments, the method further includes forming a first driving circuit and forming a second driving circuit. Optionally, the first driving circuit is formed in a counter substrate of the display panel, and the second driving circuit is formed in an array substrate of the display panel. Optionally, both the first driving circuit and the second driving circuit are formed in the array substrate of the display panel. Optionally, forming the first driving circuit includes forming a plurality of first gate lines, forming a plurality of first data lines, and forming a plurality of first thin film transistors configured to respectively drive light emission of first light emitting portions of the plurality of subpixels. Optionally, forming the second driving circuit includes forming a plurality of second gate lines, forming a plurality of second data lines, and forming a plurality of second thin film transistors configured to respectively drive light emission of second light emitting portions of the plurality of subpixels.

In some embodiments, the method further includes forming a color filter. Optionally, the color filter is formed in a counter substrate of the display panel. Optionally, the color filter is formed in an array substrate of the display panel.

Optionally, forming the color filter includes forming a plurality of color filter blocks on a base substrate. Optionally, the color filter is formed so that an orthographic projection of the color filter on the base substrate is substantially non-overlapping with the orthographic projection of the first light emitting portion of each of the plurality of subpixels on the base substrate. Optionally, the color filter is formed so that an orthographic projection of each individual one of the plurality of color filter blocks on the base substrate covers an orthographic projection of the second light emitting portion in a respective one of the plurality of subpixels on the base substrate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel comprising a plurality of subpixels, wherein each of the plurality of subpixels comprises a first light emitting portion and a second light emitting portion;

the display panel comprises a black matrix on a base substrate, the black matrix defining a plurality of subpixel apertures, the first light emitting portion being outside the plurality of subpixel apertures, the second light emitting portion being in a respective one of the plurality of subpixel apertures;

an orthographic projection of the black matrix on the base substrate covers an orthographic projection of the first light emitting portion of each of the plurality of subpixels on the base substrate, and is substantially non-overlapping with an orthographic projection of the second light emitting portion of each of the plurality of subpixels on the base substrate; and the first light emitting portion comprises a plurality of electronic ink microcapsules.

2. The display panel of claim 1, comprising:
- a first driving circuit comprising a plurality of first gate lines, a plurality of first data lines, and a plurality of first thin film transistors configured to respectively drive light emission of first light emitting portions of the plurality of subpixels;
- a second driving circuit comprising a plurality of second gate lines, a plurality of second data lines, and a plurality of second thin film transistors configured to respectively drive light emission of second light emitting portions of the plurality of subpixels.

3. The display panel of claim 2, wherein the display panel is configured to operate in a first display mode or a second display mode;
- wherein, in the first display mode, the first driving circuit is configured to drive light emission of the first light emitting portions of the plurality of subpixels whereas light emission of the second light emitting portions of the plurality of subpixels is turned off; and
- in the second display mode, the second driving circuit is configured to drive light emission of the second light emitting portions of the plurality of subpixels whereas light emission of the first light emitting portions of the plurality of subpixels is turned off.

4. The display panel of claim 2, wherein the orthographic projection of the black matrix on the base substrate covers orthographic projections of the first driving circuit and the second driving circuit on the base substrate.

5. The display panel of claim 2, comprising an array substrate and a counter substrate facing the array substrate;
- wherein the first driving circuit and the plurality of electronic ink microcapsules are in the counter substrate; and
- the second driving circuit is in the array substrate.

6. The display panel of claim 1, further comprising a color filter comprising a plurality of color filter blocks.

7. The display panel of claim 6, wherein an orthographic projection of the color filter on the base substrate is substantially non-overlapping with the orthographic projection of the first light emitting portion of each of the plurality of subpixels on the base substrate; and
- an orthographic projection of each individual one of the plurality of color filter blocks on the base substrate covers an orthographic projection of the second light emitting portion in a respective one of the plurality of subpixels on the base substrate.

8. The display panel of claim 6, comprising an array substrate and a counter substrate facing the array substrate;
- wherein the color filter is in the counter substrate.

9. The display panel of claim 1, comprising an array substrate and a counter substrate facing the array substrate;
- wherein the black matrix is in the array substrate.

10. The display panel of claim 1, comprising an array substrate and a counter substrate facing the array substrate;
- a liquid crystal layer between the array substrate and the counter substrate; and
- a back light module configured to provide back light to the second light emitting portion of each of the plurality of subpixels.

11. A display apparatus, comprising the display panel of claim 1, and one or more integrated circuits connected to the display panel.

12. The display apparatus of claim 11, wherein the one or more integrated circuits comprises a control circuit configured to control the display panel to operate in a first display mode or a second display mode;
- wherein, in the first display mode, the control circuit is configured to drive light emission of the first light emitting portions of the plurality of subpixels whereas light emission of the second light emitting portions of the plurality of subpixels is turned off; and
- in the second display mode, the control circuit is configured to drive light emission of the second light emitting portions of the plurality of subpixels whereas light emission of the first light emitting portions of the plurality of subpixels is turned off.

13. A counter substrate comprising a plurality of subpixel areas, wherein each of the plurality of subpixel areas comprises a first light emitting portion and a second light emitting portion, the first light emitting portion comprising a plurality of electronic ink microcapsules;
- the counter substrate further comprises a first driving circuit comprising a plurality of first gate lines, a plurality of first data lines, and a plurality of first thin film transistors configured to respectively drive light emission of first light emitting portions of the plurality of subpixel areas, the plurality of first gate lines and the plurality of first data lines intersect each other to define the plurality of subpixel areas; and
- a color filter comprising a plurality of color filter blocks on a base substrate;
- wherein an orthographic projection of the color filter on the base substrate is substantially non-overlapping with an orthographic projection of the first light emitting portion of each of the plurality of subpixel areas on the base substrate; and
- an orthographic projection of each individual one of the plurality of color filter blocks on the base substrate covers an orthographic projection of the second light emitting portion in a respective one of the plurality of subpixel areas on the base substrate.

14. The counter substrate of claim 13, further comprising a black matrix on the base substrate, the black matrix defining a plurality of subpixel apertures, the first light emitting portion being outside the plurality of subpixel apertures, the second light emitting portion being in a respective one of the plurality of subpixel apertures;
- wherein an orthographic projection of the black matrix on the base substrate covers an orthographic projection of the first light emitting portion of each of the plurality of subpixel areas on the base substrate.

15. An array substrate comprising a plurality of subpixel areas, wherein each of the plurality of subpixel areas comprises a first light emitting portion and a second light emitting portion, the first light emitting portion comprising a plurality of electronic ink microcapsules;
- the array substrate further comprises a black matrix on a base substrate, the black matrix defining a plurality of subpixel apertures, the first light emitting portion being outside the plurality of subpixel apertures, the second light emitting portion being in a respective one of the plurality of subpixel apertures;
- a first driving circuit comprising a plurality of first gate lines, a plurality of first data lines, and a plurality of first thin film transistors configured to respectively drive light emission of first light emitting portions of the plurality of subpixel areas; and
- a second driving circuit comprising a plurality of second gate lines, a plurality of second data lines, and a plurality of second thin film transistors configured to respectively drive light emission of second light emitting portions of the plurality of subpixel areas;

wherein an orthographic projection of the black matrix on the base substrate covers an orthographic projection of the first light emitting portion of each of the plurality of subpixel areas on the base substrate, and is substantially non-overlapping with an orthographic projection of the second light emitting portion of each of the plurality of subpixel areas on the base substrate.

16. The array substrate of claim 15, wherein the orthographic projection of the black matrix on the base substrate covers orthographic projections of the first driving circuit and the second driving circuit on the base substrate; and
the plurality of first gate lines and the plurality of first data lines intersect each other, and the plurality of second gate lines and the plurality of second data lines intersect each other, thereby defining the plurality of subpixel areas.

17. The array substrate of claim 16, further comprising a color filter comprising a plurality of color filter blocks.

18. The array substrate of claim 17, wherein an orthographic projection of the color filter on the base substrate is substantially non-overlapping with the orthographic projection of the first light emitting portion of each of the plurality of subpixel areas on the base substrate; and
an orthographic projection of each individual one of the plurality of color filter blocks on the base substrate covers an orthographic projection of the second light emitting portion in a respective one of the plurality of subpixel areas on the base substrate.

19. A method of operating a display panel of claim 1 to display image in a first display mode or a second display mode, the display panel comprising a plurality of subpixels;
wherein each of the plurality of subpixels comprises a first light emitting portion and a second light emitting portion;
the display panel comprises a black matrix on a base substrate, the black matrix defining a plurality of subpixel apertures, the first light emitting portion being outside the plurality of subpixel apertures, the second light emitting portion being in a respective one of the plurality of subpixel apertures;
an orthographic projection of the black matrix on the base substrate covers an orthographic projection of the first light emitting portion of each of the plurality of subpixels on the base substrate; and
the first light emitting portion comprises a plurality of electronic ink microcapsules;
the method comprises:
in the first display mode, driving light emission of the first light emitting portions of the plurality of subpixels while turning off light emission of the second light emitting portions of the plurality of subpixels; and
in the second display mode, driving light emission of the second light emitting portions of the plurality of subpixels while turning off light emission of the first light emitting portions of the plurality of subpixels.

20. A method of fabricating a display panel of claim 1, comprising forming a plurality of subpixels; and
forming a black matrix on a base substrate to define a plurality of subpixel apertures;
wherein forming the plurality of subpixels comprises forming a first light emitting portion and forming a second light emitting portion in each of the plurality of subpixels;
the first light emitting portion is formed outside the plurality of subpixel apertures;
the second light emitting portion is formed in a respective one of the plurality of subpixel apertures;
the black matrix is formed so that an orthographic projection of the black matrix on the base substrate covers an orthographic projection of the first light emitting portion of each of the plurality of subpixels on the base substrate; and
forming the first light emitting portion comprises forming a plurality of electronic ink microcapsules.

* * * * *